United States Patent [19]

Allegretto et al.

[11] Patent Number: 5,408,308

[45] Date of Patent: Apr. 18, 1995

[54] METHOD FOR MONITORING HERMETICALLY-COATED FIBERS

[75] Inventors: Allen E. Allegretto, Wilmington, N.C.; Thomas J. Atwood, Corning, N.Y.; Bruce W. Reding, Elmira, N.Y.; Robert M. Trusty, Horseheads, N.Y.

[73] Assignee: Corning Incorporated, Corning, N.Y.

[21] Appl. No.: 11,393

[22] Filed: Jan. 29, 1993

[51] Int. Cl.$^6$ .................. G01N 21/84; G01B 11/06
[52] U.S. Cl. .................................................. 356/73.1
[58] Field of Search ...................................... 356/73.1

[56] References Cited

U.S. PATENT DOCUMENTS

| | | | |
|---|---|---|---|
| 3,982,816 | 9/1976 | Watkins . | |
| 4,067,651 | 1/1978 | Watkins . | |
| 4,280,827 | 7/1981 | Murphy et al. | 65/13 |
| 4,735,856 | 4/1988 | Schultz et al. | 428/366 |
| 4,952,226 | 8/1990 | Frazee et al. | 65/3.12 |
| 5,000,541 | 3/1991 | DiMarcello et al. | 427/163 X |
| 5,013,130 | 5/1991 | Atkins et al. . | |
| 5,035,484 | 7/1991 | Ishiguro et al. | 427/60 X |
| 5,142,228 | 8/1992 | Kingsbury | 324/230 |
| 5,208,645 | 5/1993 | Inoue et al. | 356/73.1 |
| 5,237,383 | 8/1993 | Parisi | 356/73.1 |

FOREIGN PATENT DOCUMENTS

| | | |
|---|---|---|
| 0443322 | 8/1991 | European Pat. Off. . |
| 0475369 | 3/1992 | European Pat. Off. . |
| 3715922 | 5/1987 | Germany . |
| 6283339 | 10/1985 | Japan . |
| 6283340 | 10/1985 | Japan . |

OTHER PUBLICATIONS

*SBIR Phase I Final Report: Method for Detecting Pinholes in Hermetic Coatings of Optical Fibers,* U.S. Army CECOM, Attn: AMSEL-RD-C3-LA-F, Fort Monmouth, N.J. 07703, Contract #DAAB07-91-C-B008, Topic #A90-219, Tai Inc., Aug. 1991.

Inoue et al., "Development of Non-Contact Coating Thickness Monitor for Hermetically Carbon Coated Fiber," *Conference Digest* for the Proceedings of the Optical Fibre Measurement Conf., Sep. 1991, York, England, pp. 135–138.

Absuhagur et al., "Measurement of Optical Fiber Diameter Using the Fast Fourier Transform," *Applied Optics,* vol. 19, pp. 2031–2033 (1980).

DiMarcello et al., "Fiber Drawing and Strength Properties," *Optical Fiber Communications,* ed. T. Li, vol. 1, Academic Press Inc., pp. 179–248 (1985).

Fejer et al.; "High-Speed High-Resolution Fiber Diameter Variation Measurement System"; *Applied Optics,* vol. 24, No. 15, Aug. 1985; pp. 2362–2368.

Daniere et al.; "A New Apparatus for Recording the Diameter Fluctuations of an Optical Fibre"; *Journ. of Physics E; Scientific Instruments;* vol. 18, No. 10, Oct. 1985; pp. 854–858.

Primary Examiner—Vincent P. McGraw
Attorney, Agent, or Firm—K. McNeill Taylor, Jr.; Jay M. Brown

[57] ABSTRACT

A method for monitoring the thickness of a hermetic coating on an optical waveguide fiber is provided in which an interference pattern is produced by illuminating the fiber with a laser beam. A spatial frequency spectrum is generated for the interference pattern and a first component of that spectrum, corresponding to the outside diameter of the fiber, is identified. The magnitude of this component is inversely related to the thickness of the coating, i.e., the magnitude decreases as the coating thickness increases, and thus this magnitude can be used to monitor the thickness of the coating during, for example, the coating process. Effects of fluctuations in the power of the laser beam and/or movement of the fiber relative to that beam can be minimized by normalizing the magnitude of the first component by the magnitude of the DC component of the spatial frequency spectrum.

26 Claims, 6 Drawing Sheets

METHOD FOR MONITORING HERMETICALLY-COATED FIBERS

FIELD OF THE INVENTION

This invention relates to methods and apparatus for monitoring the application of a hermetic coating to an optical waveguide fiber and, in particular, for monitoring the thickness of such a coating.

BACKGROUND OF THE INVENTION

As is known in the art, the deposition of a thin film or coating of, for example, carbon onto an optical waveguide fiber can reduce water corrosion of the fiber, as well as other types of chemically induced fatigue. In addition, such coatings are effective in reducing light attenuation resulting from absorption of hydrogen into the fiber from the environment.

Such thin films or coatings are generally referred to as hermetic coatings. As used herein, the term "hermetic coating" shall mean a thin film applied to a filament wherein the film is capable of absorbing light. Descriptions of these coatings and of apparatus and techniques for applying them to fibers as part of the fiber drawing process can be found in, for example, DiMarcello et al., U.S. Pat. No. 5,000,541, Ishiguro et al., U.S. Pat. No. 5,035,484, Schultz et al., U.S. Pat. No. 4,735,856, and Japanese Patent Publications 62-83,339 and 62-83,340. A discussion of a proposed technique for detecting defects in hermetic coatings appears in *SBIR Phase I Final Report: Method for Detecting Pinholes in Hermetic Coatings of Optical Fibers*, U.S. Army CECOM, Attn: AMSEL-RD-C3-LA-F, Fort Monmouth, N.J. 07703, Contract #DAAB07-91-C-B008, Topic #A90-219, TAI Inc., August 1991. The report also mentions measuring hermetic thicknesses.

In order to control the coating process, means must be provided for rapidly and reliably monitoring the thickness of the coating. A number of techniques have been disclosed in the art. Some have been based on the electrical properties of the hermetic coating. See Atkins et al., U.S. Pat. No. 5,013,130 and Kingsbury, U.S. Pat. No. 5,142,228. Others have employed an optical approach.

In particular, Frazee, Jr. et al., U.S. Pat. No. 4,952,226, discloses a system for monitoring the thickness of a carbon coating on a fiber with a polymer coating in which a laser beam is directed at the fiber and the intensity of the forward-scattered light is measured. As reported in this patent, the measured intensity is monotonically inversely proportional to the thickness of the carbon coating. As shown in Frazee's FIG. 5, the laser beam is split in two so that two intensity measurements can be made at right angles to one another.

Significantly, with regard to the present invention, the Frazee patent at column 4, lines 60–62, specifically teaches "eliminating the fine structure corresponding to interference of refracted and reflected rays." As discussed in detail below, the monitoring technique of the present invention is based on analyzing the interference pattern produced by the reflected and refracted rays, that is, the present invention relies on that which Frazee purposely eliminates.

A technique similar to the Frazee technique is disclosed in Inoue et al., "Development of Non-Contact Coating Thickness Monitor for Hermetically Carbon Coated Fiber," *Conference Digest* for the Proceedings of the Optical Fibre Measurement Conference, September 1991, York, England, pages 135–138. In this case, the forward scattered light is collected on a single photodiode (photodiode A in Inoue's FIG. 1), which as in Frazee, eliminates all of the fine structure from the scattering pattern.

Both the Frazee and Inoue techniques suffer from a number of disadvantages. One disadvantage involves the effects on the thickness measurement of fluctuations in the light source's power. In each case, a decrease in power will be interpreted as increase in coating thickness, and vice versa.

Inoue seeks to address this problem by including a second photodiode (photodiode B in his FIG. 1) to measure the power of what he refers to as the "reference light." The problem with this approach is that the optical fiber does not stay in one position as the drawing and hermetic coating process takes place, but rather moves around in the light beam. Since most laser source light beams have a Gaussian power distribution, this movement means that the fiber will be seeing different power intensities as a function of time. Inoue's photodiode B is fixed in space and thus only provides information about the average power of the beam, rather than the power of the light which has interacted with the fiber.

The Frazee apparatus includes rotatable cubes 45 and 46, each mounted on the shaft of a servo motor, for aligning Frazee's orthogonal laser beams with the fiber. See Frazee at column 5, lines 22–27. Frazee, however, does not disclose that the cubes are used to follow the changing position of the fiber as the drawing and coating process takes place. Also, Frazee does not provide a system for tracking overall power drift of his laser.

Another problem with the Inoue approach is illustrated in his FIG. 3. As shown therein, Inoue's attenuation factor increases in magnitude up to a coating thickness of around 800 angstroms and thereafter decreases in magnitude. That is, the function is double valued, i.e., the same attenuation value corresponds to two coating thicknesses. An ambiguity can thus arise in applying the technique to process control such that the controller may erroneously call for an increase in coating thickness where a decrease is actually needed.

A fundamental disadvantage of both the Frazee and Inoue approaches is that in each case the measured variable, total forward scattered light intensity, is a combination of reflected and refracted light whereas it is only the refracted light which contains information about the thickness of the coating since it is that light which has passed through the coating. That is, Frazee and Inoue look at an additive signal wherein the desired information in the refracted light is of low intensity relative to the undesired reflected light and is desensitized (swamped out). This is increasingly a problem as the coating gets thicker. As discussed below, the measured variable in the present invention, variation of fringe contrast, is substantially a direct function of the refracted light and thus is not susceptible to being swamped out by the reflected light.

The use of spatial frequency spectra to measure fiber diameters is discussed in an article by Mustafa A. G. Absuhagur and Nicholas George entitled "Measurement of optical fiber diameter using the fast Fourier transform," *Applied Optics*, Vol. 19, pages 2031–2033 (1980). This reference, however, contains no disclosure or suggestion that such spectra can be used to monitor the thickness of a hermetic coating on a fiber.

SUMMARY OF THE INVENTION

In view of the foregoing state of the art, it is an object of this invention to provide improved methods and apparatus for monitoring the thickness of hermetic coatings on optical waveguide fibers or, more generally, any transparent filament. More particularly, it is an object of the invention to provide an optical technique for such monitoring which automatically compensates for power fluctuations in the light source and for motion of the filament relative to the light source.

To achieve these and other objects, the invention uses information specifically made available in the Fourier domain of a spatial fringe pattern to determine the thickness of a hermetic coating. More particularly the invention provides a method for monitoring the thickness of a hermetic coating on a transparent filament comprising the steps of:

(a) directing a beam of radiation at the filament so as to produce an interference pattern;
(b) detecting the interference pattern;
(c) generating a spatial frequency spectrum for the interference pattern;
(d) identifying a first component of the spatial frequency spectrum, the first component corresponding to the outer diameter of the filament; and
(e) determining a value for the magnitude of the first component, said magnitude being indicative of the thickness of the hermetic coating.

In certain preferred embodiments, the method includes the additional steps of:

(f) identifying a second component of the spatial frequency spectrum, said second component being the DC component of the spectrum;
(g) determining a value for the magnitude of the second component; and
(h) normalizing the value of the magnitude of the first component by the magnitude of the second component, said normalized value being indicative of the thickness of the hermetic coating.

In other preferred embodiments, the beam of radiation has a substantially constant polarization which, most preferably, has its electric field component substantially parallel to the longitudinal axis of the filament. In further preferred embodiments, the interference pattern is detected at a location which is angularly displaced from the axis of the light beam, e.g., at an angle of 61.5° from the axis.

The accompanying drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

Figure 1:
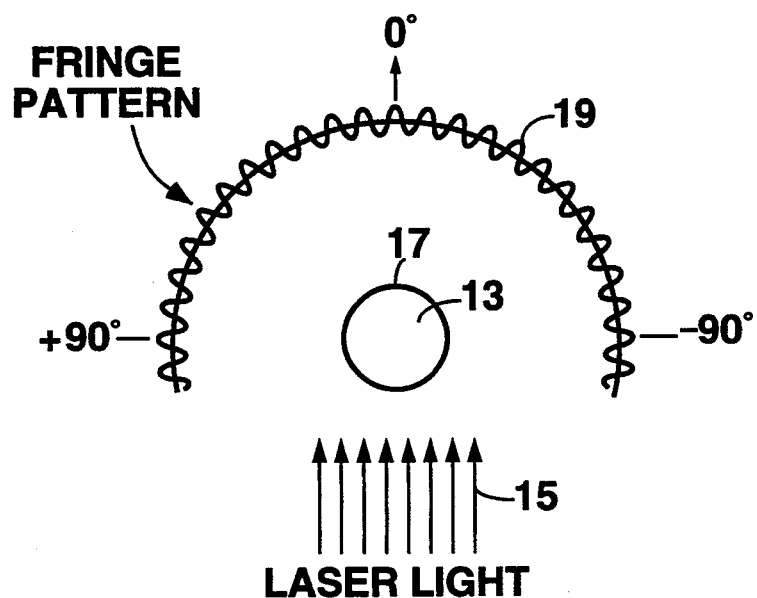
FIG. 1 is a schematic diagram illustrating the basic elements of a Watkins-type system for measuring fiber diameters using far-field interference patterns.

As discussed above, the present invention relates to methods and apparatus for monitoring the thickness of hermetic coatings on transparent filaments.

A particularly important application of the invention is in the area of control systems for applying such coatings to optical waveguide fibers. As indicated in the prior art discussed above, hermetic coatings are normally applied to optical waveguide fibers during the drawing process, and thus the methods and apparatus of the present invention are preferably incorporated into the overall fiber measurement/control system for that process.

Commonly assigned U.S. patent applications Ser. Nos. 07/816,882, (now Fischer et al U.S. Pat. No. 5,309,221) 07/816,491, (now Watson et al U.S. Pat. No. 5,283,628) and 07/816,883, (now Button et al U.S. Pat. No. 5,185,636) filed Dec. 31, 1991, and entitled "Measurement of Fiber Diameters with High Precision", "Method for Measuring Diameters of Non-Circular Fibers", and "Method for Detecting Defects in Fibers", respectively, discuss various aspects of the fiber measurement/control process. The relevant portions of these applications are incorporated herein by reference. General discussions of fiber drawing can be found in, for example, DiMarcello et al., "Fiber Drawing and Strength Properties," *Optical Fiber Communications*, ed. T. Li, Vol. 1, Academic Press Inc., pages 179–248 (1985) and the references cited therein.

Control systems for drawing fiber include apparatus for measuring fiber diameters. A widely used technique for making this measurement is that described in U.S. Pat. Nos. 3,982,816 and 4,067,651 to Lawrence Watkins. See also Murphy et al., U.S. Pat. No. 4,280,827. The basic components of the Watkins system are schematically illustrated in FIG. 1.

As shown therein, optical waveguide fiber 13, whose cross-section has been greatly expanded for purposes of illustration, is transversely illuminated by light 15 of sufficient spatial coherence and monochromaticity to create a discernible interference pattern in the far field, that interference pattern being created by the superposition of light reflected from the fiber surface 17 and light refracted through the fiber body 13. In practice, a laser, e.g., a HeNe laser, is the preferred light source because of its wavelength stability. The following discussion is thus in terms of a laser light source, it being understood that other light sources having sufficient spatial coherence and monochromaticity can be used if desired.

As explained in the Watkins patents, in the far field, this reflected and refracted light interferes to form fringe pattern 19. For an optical waveguide fiber having a core and a cladding, the fringe pattern will in general be a function of the wavelength of the incident light and of the indices of refraction and the diameters of both the core and the cladding. However, as shown by Watkins, if the core/clad ratio is not too large and if the fringe pattern is examined at sufficiently large angles, e.g., above about ±50° in FIG. 1 for core/clad ratios of less than about 0.5, the pattern will depend almost exclusively on the diameter and index of refraction of the cladding.

Accordingly, if the index of refraction of the cladding is known, the outside diameter (O.D.) of the fiber can be determined by analyzing the fringe pattern. For example, the diameter can be estimated with relatively good precision by counting the number of full and partial fringes between two angles and then converting that number to a fiber diameter value using the equations of the Watkins patents or an empirical calibration.

Figure 2:
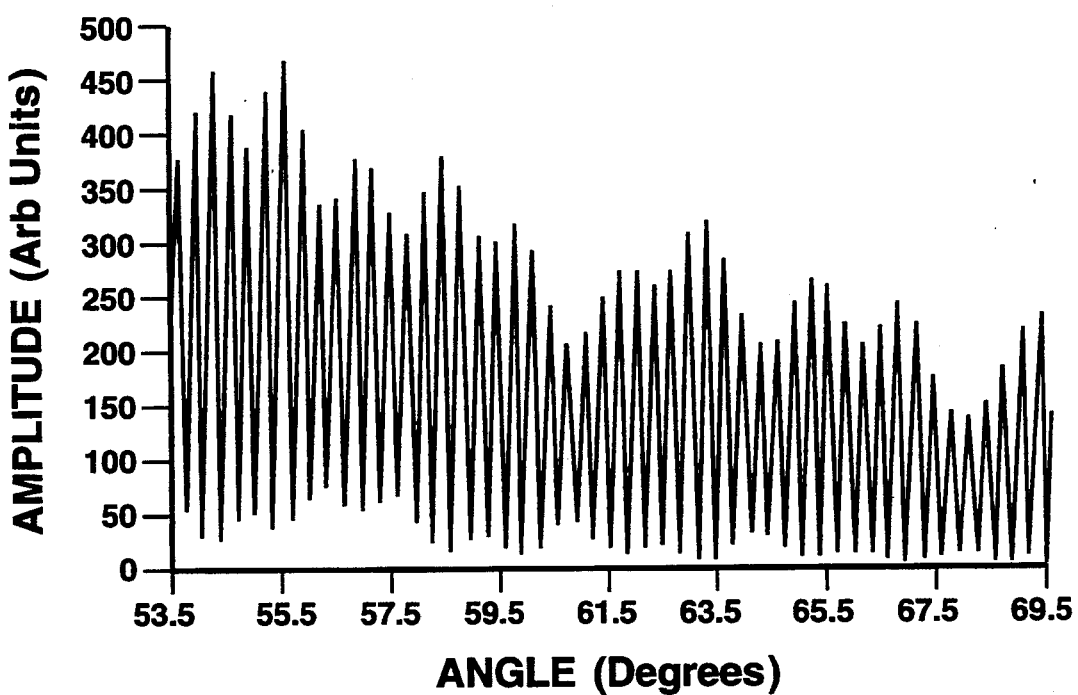
FIG. 2 shows a typical far-field interference pattern of an uncoated 125 micron, coreless fiber for the angular range between 53.5 and 69.5 degrees.

A typical fringe pattern in the range from +50° to +70° for a 125 micron single mode fiber is shown in FIG. 2. Approximately 62 fringes appear in this 20° range, which is as predicted by the Watkins model.

Rather than counting fringes, fiber diameters can also be determined by generating a spatial frequency spectrum for the interference pattern and detecting a component of that spectrum which corresponds to the outside diameter of the fiber (hereinafter referred to as the "O.D. component", the "O.D. line", or the "first component"). Like the number of fringes between two angles, the frequency of the O.D. component is directly related to the diameter of the fiber.

Figure 3:
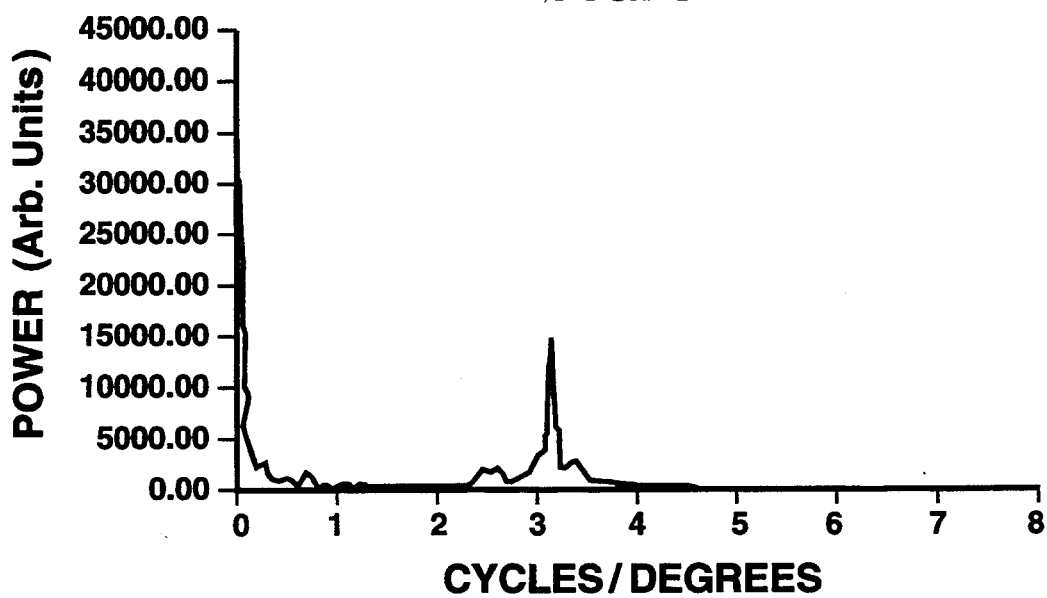
FIG. 3 shows the frequency spectrum of the fringe pattern of FIG. 2.

A typical spatial frequency spectrum for the fringe pattern of FIG. 2 is shown in FIG. 3. The O.D. line in this figure is located at approximately 3.1 fringes/degree. Also shown in this figure is the DC component (discussed below) which is located at 0.0 fringes/degree (also referred to herein as the "second component").

The Absuhagur and George reference, supra, discusses the use of fast Fourier transforms (FFTs) to generate the frequency spectrum from which the O.D. component is detected. The above referenced application entitled "Measurement of Fiber Diameters with High Precision" describes an improved method for determining the frequency of the O.D. component. The methods for identifying the O.D. component disclosed in that application are the preferred methods for practicing the present invention and the disclosure of that application relating to those methods is hereby incorporated by reference into this application.

In accordance with the present invention, it has been surprisingly found that the thickness of a hermetic coating on the surface of a transparent filament can be monitored by means of the magnitude (peak height) of the O.D. component. This magnitude can be viewed as being a function of the contrast of the interference pattern and the contrast, in turn, can be viewed as being a function of the thickness of the hermetic coating.

These relationships can be seen as follows. As discussed above, the interference pattern is a result of the interaction of reflected and refracted light where for a hermetically-coated fiber, the reflected light is light which has been reflected from the outer surface of the coating and the refracted light is light which has passed through the coating and the fiber. Some reflection also occurs at the outer surface of the fiber and some refraction occurs at the air/coating and coating/fiber interfaces. However, in view of the thinness of the coating, e.g., 100 to 1000 angstroms with a nominal value of 500 angstroms, these effects are in general small.

Consider for the moment the case where there is no coating and assume that the reflected and refracted light have equal intensities $I_0$. To a first approximation, the interference pattern will then be a "high contrast" sinusoid having peaks of intensity $2I_0$ and valleys of intensity 0. The spatial frequency spectrum of this pattern will have an O.D. line whose magnitude is proportional to $I_0$ and a DC line whose magnitude is also proportional to $I_0$.

Next consider the case where the hermetic coating is so thick that it completely absorbs the refracted light beam. In this case, to a first approximation, the detected pattern will have constant illumination of intensity $I_0$, the intensity of the reflected beam. The pattern will thus have no contrast, and its spatial frequency pattern will be an O.D. line having no magnitude and a DC line whose magnitude is proportional to $I_0$.

In between these extremes, the intensity of the refracted beam decreases monotonically with the thickness of the hermetic coating and accordingly so does the contrast of the interference pattern and the magnitude of the O.D. line. Thus, by monitoring the magnitude of the O.D. line, one monitors the thickness of the coating.

In practice, monitoring of the O.D. line means repetitively determining the magnitude of this line as the fiber is drawn past the light source. Controlling the coating process based on such monitoring means using the magnitudes of the O.D. line to increase, decrease, or hold constant the amount of coating material applied to the fiber. As is conventional, the decision to increase, decrease, or hold constant will normally be based on calibration values for the O.D. magnitude (and/or the OD/DC ratio, see below) obtained using fibers having known coating thicknesses.

In view of the foregoing mode of operation, the present invention can be used with essentially any hermetic coating whose light absorption increases with thickness. The carbon coatings employed to protect optical waveguide fibers from water and hydrogen absorption are of this type.

As the above analysis shows, the magnitude of the O.D. line is a direct function of the thickness of the hermetic coating, not an additive function as in the Frazee and Inoue techniques. Accordingly, the present invention is not susceptible to having its signal swamped out by the reflected beam as in the prior art techniques.

As indicated above, the prior art techniques suffered from problems due to 1) variations in the power of the light source, and/or 2) movement of the fiber relative to the light source. In accordance with the present invention, these problems are addressed and solved by normalizing the magnitude of the O.D. line by the magnitude (peak height) of the DC line, that is, by dividing the magnitude of the O.D. line by the magnitude of the DC line.

The magnitude of both the DC and the O.D. Fourier lines is linearly related to the intensity of the source. Therefore, the ratio of the two is independent of source power variation. This holds for all values of coating thickness, from zero angstroms to the thickness that causes the refracted ray to be completely attenuated.

It should be noted that a transition occurs between a bare fiber and a fiber having a thin hermetic coating. Specifically, in order to achieve substantially constant reflection, a minimum coating thickness, e.g., on the order of 200 angstroms for a carbon coating, is required.

Accordingly, the above first order analysis applies for fibers having this minimum level of coating. It should be further noted that the basic technique continues to be applicable for coatings under 200 angstroms however the analysis needs to take account of the fact that the reflected ray is no longer constant.

The intensity of the reflected and refracted light will vary with the polarization of the incident light. Accordingly, to avoid errors in the monitoring of the coating thickness, the polarization of the light source needs to be substantially constant. Preferably, the polarization should be linear polarization of high purity. Also, in practice, it has been found that the spatial frequency spectrum is cleaner (less noisy) if the polarization is such that the beam's electric field component is substantially parallel to the longitudinal axis of the fiber. Polarization control both in terms of polarization direction and variation of polarization with time can be readily achieved through the use of a laser light source and a polarizing beamsplitter. Alternatively, a linearly polarized laser can be used. Other ways of achieving polarized light can also be used if desired.

Figure 7:
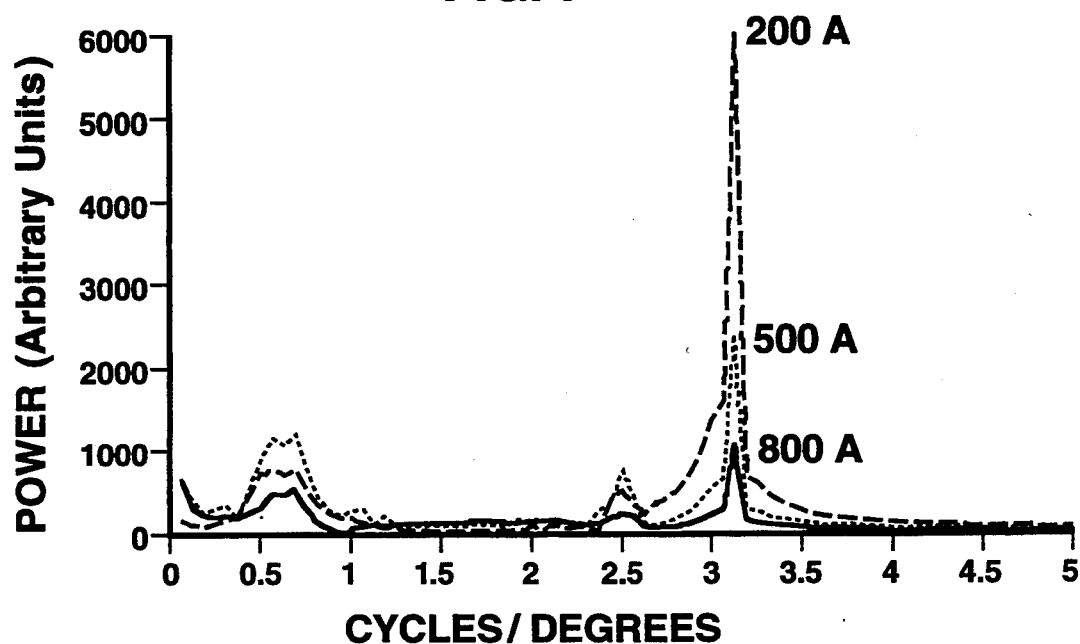
FIG. 7 is an expanded view of the portion of the spectrums of FIGS. 6A, 6B, and 6C around the O.D. line.

The operation of the system is illustrated in FIGS. 5–8. FIGS. 5A, 5B, and 5C show typical far-field interference patterns for a thin (200 angstroms), medium (500 angstroms), and thick (800 angstroms) hermetic coating, respectively. FIGS. 6A, 6B, and 6C show the Fourier frequency spectrums of the interference patterns of FIGS. 5A, 5B, and 5C, respectively, and FIG. 7 shows an expanded view of the portion of these spectrums around the O.D. line. The change (decrease) in the magnitude of the O.D. line with increasing coating thickness is evident in these figures.

Figure 8:
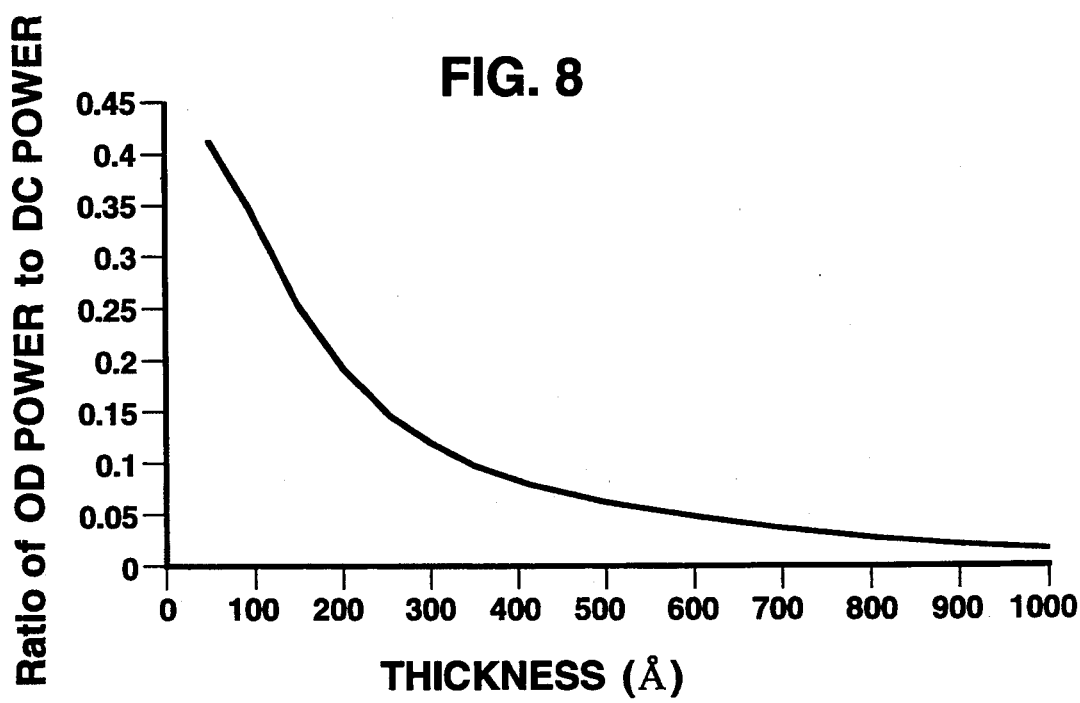
FIG. 8 shows a typical curve of the ratio of O.D. line power to DC line power versus coating thickness.

FIG. 8 shows a typical curve of the O.D./DC ratio versus coating thickness. The monotonic behavior of this variable with thickness can be seen in this figure.

Figure 4:
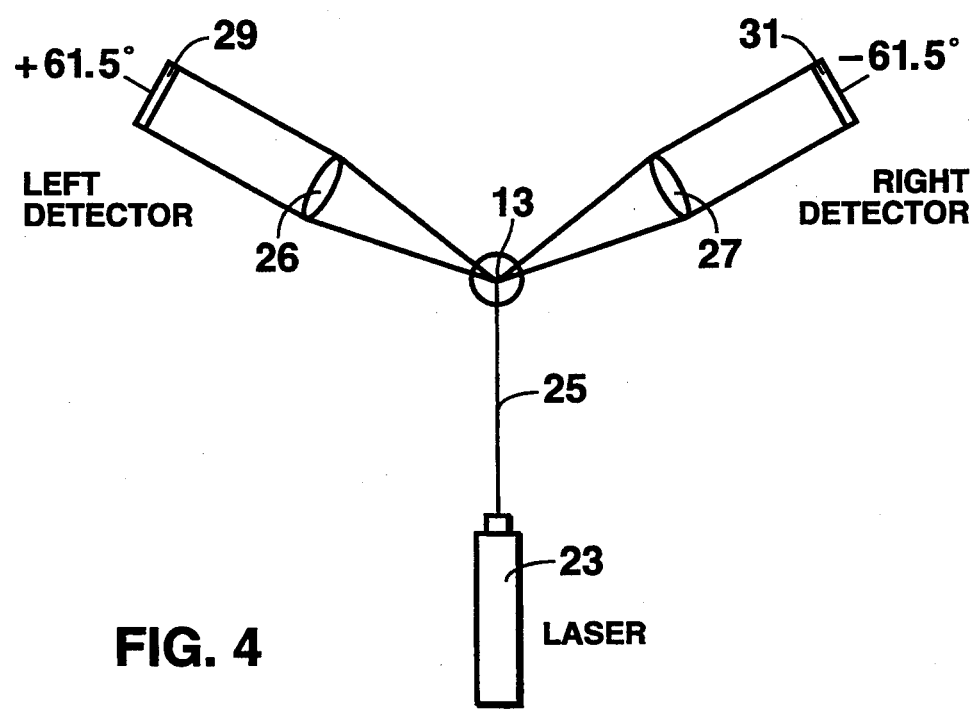
FIG. 4 is a schematic diagram illustrating the components of a fiber diameter measurement system with which the present invention can be used.
Figure 5A:
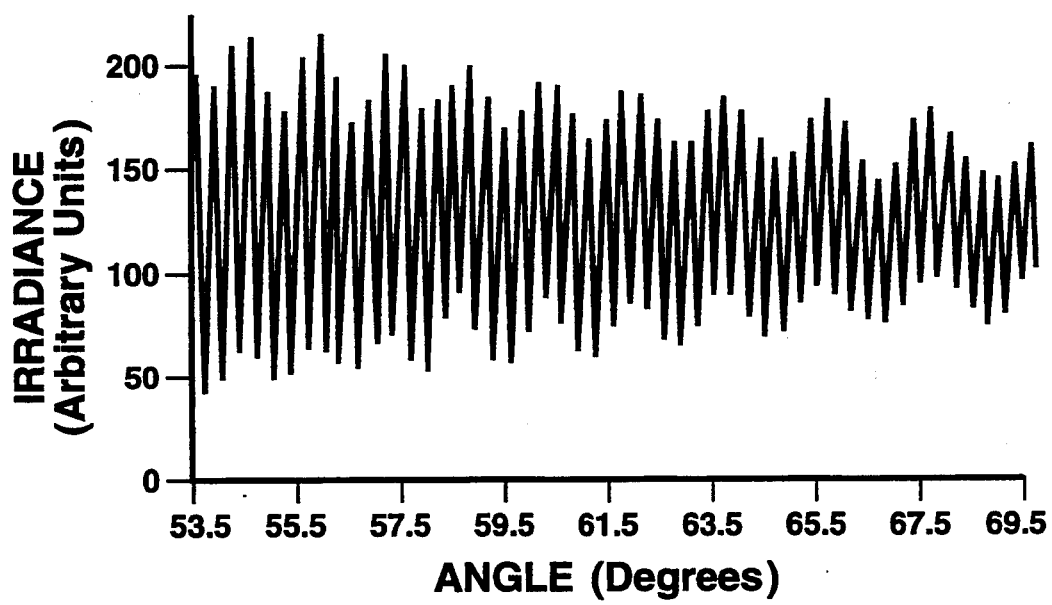
FIGS. 5A, 5B, and 5C show typical far-field interference patterns for a 125 micron, coreless fiber for the angular range between 53.5 and 69.5 degrees for a thin (200 angstroms), medium (500 angstroms), and thick (800 angstroms) hermetic coating, respectively.
Figure 5B:
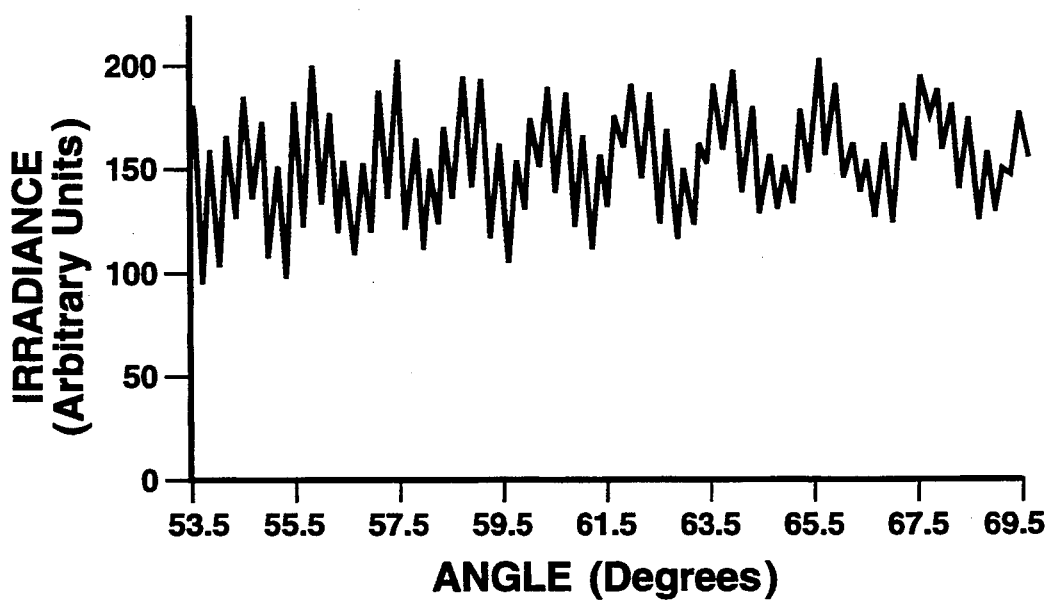
Figure 5C:
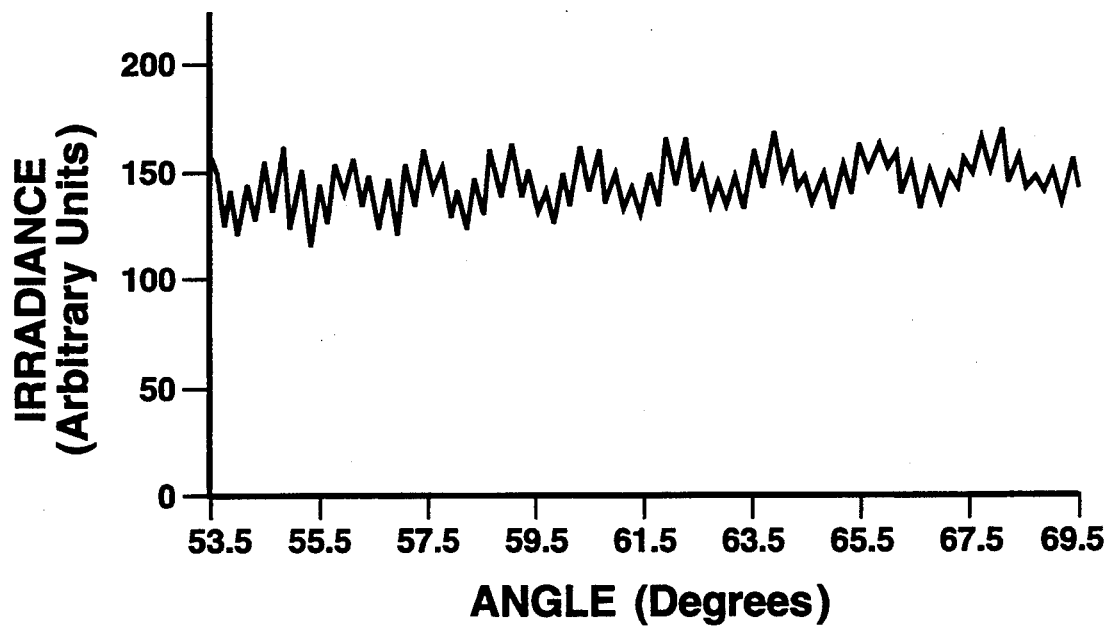
Figure 6A:
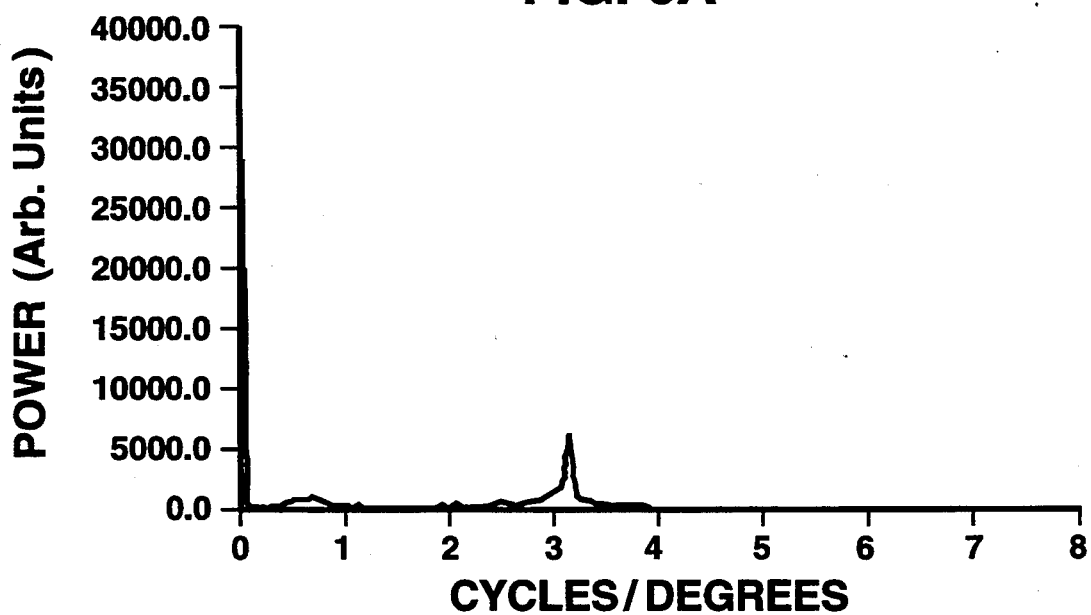
FIGS. 6A, 6B, and 6C show the Fourier frequency spectrums of the interference patterns of FIGS. 5A, 5B, and 5C, respectively.
Figure 6B:
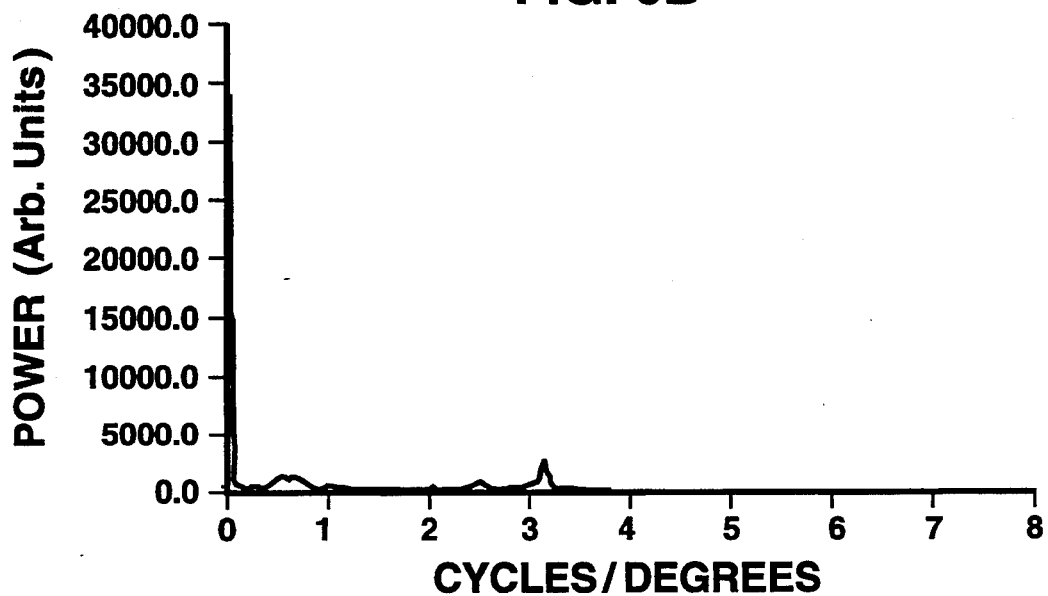
Figure 6C:
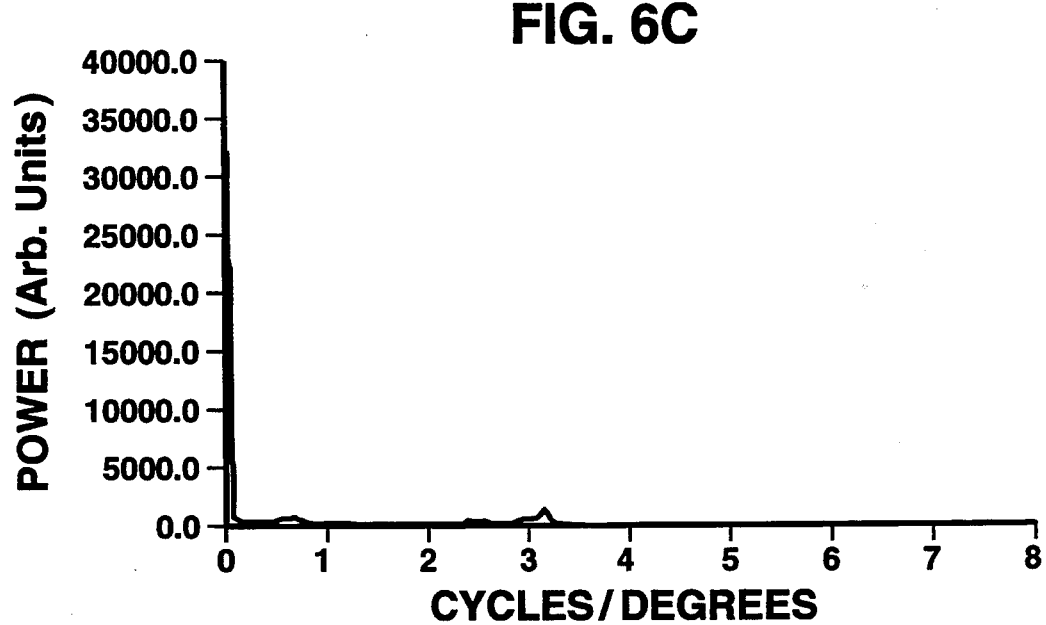

As discussed above, the present invention is preferably practiced as part of an overall fiber measurement/control system having capabilities of the type disclosed in U.S. patent applications Ser. Nos. 07/816,882, 07/816,491, and 07/816,883, supra. FIG. 4 shows a measurement system constructed in accordance with the aforementioned application entitled "Method for Measuring Diameters of Non-Circular Fibers."

The system includes laser 23 which produces a beam 25 of collimated, coherent, monochromatic light. As discussed above, light from beam 25 is reflected and refracted by fiber 13 so as to produce a far-field interference pattern of the type shown in FIG. 1. Optical systems 26, 27 project the far-field interference pattern onto left and right detectors 29, 31. The detectors can comprise linear arrays of photodetectors whose output, after analog to digital conversion, consists of a digital representation of the fringe pattern. A discussion of optical systems 26, 27 and their relationship to detectors 29, 31 can be found in the above referenced application entitled "Measurement of Fiber Diameters with High Precision."

As shown in FIG. 4, the center of detector 29 lies at +61.5° and the center of detector 31 lies at −61.5°. The derivation of these values is discussed in detail in the above referenced application entitled "Method for Measuring Diameters of Non-Circular Fibers." A suitable angular extent for each detector is 20°, i.e., from +51.5° to +71.5° for detector 29 and from −51.5° to −71.5° for detector 31. Detectors having other angular extents can, of course, be used if desired. For example, in practice, a detector having an angular extent of 16° has been found to work successfully.

In accordance with the above application, the output of each detector is analyzed separately to generate a signal representative of the diameter of the fiber, and the two signals are averaged to produce a final signal which is representative of the fiber diameter and which is substantially insensitive to fiber ellipticity. In accordance with the present invention, the output of each of the detectors can be analyzed to determine two O.D. magnitudes or, preferably, two OD/DC magnitudes. By comparing and/or averaging these values, even finer control of hermetic thicknesses can be achieved, if desired. Also, non-uniformities in the hermetic coating can be detected by means of multiple detectors.

It should be noted that the off-axis location of the detectors 29, 31 provide an advantage for the present invention by avoiding error from unscattered light, i.e., light from the light source which has not interacted with the fiber.

The plots of FIGS. 2–3 and 5–8 are based on computed fringe patterns for a 125 micron, coreless fiber, i.e., they are modeled results. In particular, the plots were generated using a wave theory model. The model assumed a circularly symmetrical cylinder with an optically non-absorbing 125 micron center region of refractive index $n=1.457$ coated by an outer layer of amorphous carbon with a complex index of refraction $n=2.5+1.5i$. A plane wave of wavelength 0.633 microns with the E-field polarized parallel to the cylinder's axis and directed perpendicularly to this axis at the cylinder generated the far-field intensity patterns shown.

For purposes of illustration, the spatial frequency spectrums were obtained by performing fast Fourier transforms (FFT) on the calculated fringe data using the Cooley, Lewis, and Welch technique as described in their paper entitled "The Fast Fourier Transform and its Applications," IBM Research Paper RC 1743, Feb. 9, 1967. As discussed above, in the practice of the invention, it is preferred to use the techniques of the above referenced application entitled "Measurement of Fiber Diameters with High Precision." In particular, the discrete Fourier transform techniques described therein provide a more precise location for the O.D. line and thus a more precise value for the magnitude of that line for use in monitoring hermetic coating thicknesses. Since the location of the DC component is known, i.e., it is at 0.0 fringes/degree, the FFT spectrum can be used for determining the magnitude of this component.

The process of the invention as described above is preferably practiced on a digital computer system configured by suitable programming to perform the various computation, identification, magnitude determination, and normalization steps. The programming can be done in various programming languages known in the art. A preferred programming language is the C language which is particularly well-suited to performing scientific calculations. Other languages which can be used include FORTRAN, BASIC, PASCAL, C++, and the like.

The computer system can comprise a general purpose scientific computer and its associated peripherals, such as the computers and peripherals currently being manufactured by Digital Equipment Corporation, IBM, Hewlett-Packard, or the like. Alternatively, a dedicated system can be used in the practice of the invention, such as a system using multiple digital signal processing chips.

Preferably, the processing portion of the computer system should have the following characteristics: a processing rate of 50 million floating point operations per second; a word length of 32 bits floating point, at least four megabytes of memory, and at least 40 megabytes of disk storage. The system should include means for inputting data from the photodetector array and means for outputting the results of the thickness detection both in electronic form for use in process control and in visual form for observation by system operators, maintenance personnel, and the like. The output can also be stored on a disk drive, tape drive, or the like for further analysis and/or subsequent display.

It should be noted that for hermetic coatings which are not too thick, i.e., for hermetic coatings for which an O.D. line can be identified in the spatial frequency spectrum, the location of the O.D. line can be used to monitor fiber diameter in accordance with the above referenced application entitled "Measurement of Fiber Diameters with High Precision." Similarly, defects can be detected using the techniques of the above referenced application entitled "Method for Detecting Defects in Fibers," specifically, the technique in which the spatial frequency spectrum is examined for the presence of a peak between the DC peak and the O.D. peak, such a peak being indicative of the presence of a defect in the fiber. Accordingly, through the combination of the techniques of the present invention with those of the foregoing applications, coating monitoring, O.D. monitoring, and defect detection can all be performed simultaneously by means of a single spatial frequency spectrum (or two or more of such spectra if the problem of non-circular fibers is also to be addressed in accordance with the above referenced application entitled "Method for Measuring Diameters of Non-Circular Fibers").

Although preferred and other embodiments of the invention have been described herein, other embodiments may be perceived by those skilled in the art without departing from the scope of the invention as defined by the following claims.

What is claimed is:

1. A method for monitoring the thickness of a hermetic coating on a transparent filament comprising the steps of:
    (a) directing a beam of radiation at said filament so as to produce an interference pattern;
    (b) detecting said interference pattern;
    (c) generating a spatial frequency spectrum for said interference pattern;
    (d) identifying a first component of said spatial frequency spectrum, said first component corresponding to the outer diameter of the filament; and
    (e) determining a value for the magnitude of the first component, said magnitude being indicative of the thickness of the hermetic coating.

2. The method of claim 1 comprising the additional steps of:
    (f) identifying a second component of said spatial frequency spectrum, said second component being the DC component of the spectrum;
    (g) determining a value for the magnitude of the second component; and
    (h) normalizing the value of the magnitude of the first component by the magnitude of the second component, said normalized value being indicative of the thickness of the hermetic coating.

3. The method of claim 1 wherein the polarization of the beam of radiation is substantially constant.

4. The method of claim 1 wherein the filament has a longitudinal axis and the electric field component of the beam of radiation is substantially parallel to the longitudinal axis.

5. The method of claim 1 wherein the beam of radiation defines an axis and the interference pattern is detected at a location which is angularly displaced from the axis.

6. The method of claim 1 wherein the hermetic coating comprises carbon.

7. The method of claim 1 wherein the spatial frequency spectrum is used to monitor the diameter of the filament.

8. The method of claim 1 wherein the spatial frequency spectrum is used to detect defects in the filament.

9. The method of claim 1 wherein steps (b) through (e) are performed at each of two spatially separated locations.

10. A technique for measuring the thickness of a hermetic coating on an optical fiber in which an interference fringe pattern is generated by transversely illuminating said optical fiber with coherent light and the fringe pattern is analyzed to determine the thickness.

11. The method of claim 10 wherein the polarization of the coherent light is substantially constant.

12. The method of claim 10 wherein the optical fiber has a longitudinal axis and the electric field component of the coherent light is substantially parallel to the longitudinal axis.

13. A method for controlling the coating of a transparent filament with a hermetic film comprising the steps of:
    (a) directing a beam of radiation at said filament so as to produce an interference pattern;
    (b) detecting said interference pattern;
    (c) generating a spatial frequency spectrum for said interference pattern;
    (d) identifying a first component of said spatial frequency spectrum, said first component corresponding to the outer diameter of the filament;
    (e) determining a value for the magnitude of the first component, said magnitude being indicative of the thickness of the hermetic film; and
    (f) generating a control signal for the coating of the filament from the magnitude of the first component.

14. The method of claim 13 wherein the polarization of the beam of radiation is substantially constant.

15. The method of claim 13 wherein the filament has a longitudinal axis and the electric field component of the beam of radiation is substantially parallel to the longitudinal axis.

16. The method of claim 13 wherein the beam of radiation defines an axis and the interference pattern is detected at a location which is angularly displaced from the axis.

17. The method of claim 13 wherein the spatial frequency spectrum is used to control the diameter of the filament.

18. The method of claim 13 wherein the spatial frequency spectrum is used to detect defects in the filament.

19. The method of claim 13 wherein steps (b) through (f) are performed at each of two spatially separated locations.

20. A method for controlling the coating of a transparent filament with a hermetic film comprising the steps of:

(a) directing a beam of radiation at said filament so as to produce an interference pattern;
(b) detecting said interference pattern;
(c) generating a spatial frequency spectrum for said interference pattern;
(d) identifying a first component of said spatial frequency spectrum, said first component corresponding to the outer diameter of the filament;
(e) determining a value for the magnitude of the first component;
(f) identifying a second component of said spatial frequency spectrum, said second component being the DC component of the spectrum;
(g) determining a value for the magnitude of the second component;
(h) normalizing the value of the magnitude of the first component by the magnitude of the second component, said normalized value being indicative of the thickness of the hermetic coating; and
(i) generating a control signal for the coating of the filament from the normalized value of the magnitude of the first component.

21. The method of claim 20 wherein the polarization of the beam of radiation is substantially constant.

22. The method of claim 20 wherein the filament has a longitudinal axis and the electric field component of the beam of radiation is substantially parallel to the longitudinal axis.

23. The method of claim 20 wherein the beam of radiation defines an axis and the interference pattern is detected at a location which is angularly displaced from the axis.

24. The method of claim 20 wherein the spatial frequency spectrum is used to control the diameter of the filament.

25. The method of claim 20 wherein the spatial frequency spectrum is used to detect defects in the filament.

26. The method of claim 20 wherein steps (b) through (i) are performed at each of two spatially separated locations.

* * * * *